(12) United States Patent
Bull et al.

(10) Patent No.: US 9,682,415 B2
(45) Date of Patent: Jun. 20, 2017

(54) DE-STACKING PROCESS FOR THE SEPARATION OF LUBRICATED ALUMINUM SHEETS

(71) Applicant: Novelis Inc., Atlanta, GA (US)

(72) Inventors: Michael Bull, Brighton, MI (US); Anthony A. Hambley, Milford, MI (US)

(73) Assignee: Novelis Inc., Atlanta, GA (US)

( * ) Notice: Subject to any disclaimer, the term of this patent is extended or adjusted under 35 U.S.C. 154(b) by 111 days.

(21) Appl. No.: 14/592,543

(22) Filed: Jan. 8, 2015

(65) Prior Publication Data

US 2015/0274445 A1   Oct. 1, 2015

Related U.S. Application Data

(60) Provisional application No. 61/970,641, filed on Mar. 26, 2014.

(51) Int. Cl.
| | |
|---|---|
| *B65B 41/06* | (2006.01) |
| *B65H 3/08* | (2006.01) |
| *B21D 43/24* | (2006.01) |
| *B65G 59/02* | (2006.01) |

(52) U.S. Cl.
CPC ............ *B21D 43/24* (2013.01); *B65B 41/06* (2013.01); *B65H 3/0816* (2013.01); *B65G 59/02* (2013.01); *B65H 2301/4234* (2013.01)

(58) Field of Classification Search
CPC .... B65H 2220/02; B65H 3/0816; B65H 3/48; B65H 2701/18264; B65H 3/0833; B25J 15/0052; B25J 15/0061; B25J 15/0616; B21D 43/055; B65G 59/045; C10N 2240/407

USPC ........ 271/11, 16, 161, 17, 18.1, 19, 20, 209, 271/90; 414/795.6, 796.5, 797, 797.1; 83/89, 90

See application file for complete search history.

(56) References Cited

U.S. PATENT DOCUMENTS

| | | | | |
|---|---|---|---|---|
| 1,453,064 A | * | 4/1923 | Danziger | B41F 1/28 271/161 |
| 2,247,794 A | * | 7/1941 | Wallach | B29C 37/0071 118/308 |
| 2,426,957 A | * | 9/1947 | Trump | B65H 31/20 271/209 |
| 2,941,799 A | * | 6/1960 | Reincke | B65H 3/46 271/92 |
| 3,321,078 A | * | 5/1967 | Treiber | B65B 67/00 206/455 |

(Continued)

FOREIGN PATENT DOCUMENTS

ES   WO 2012089859 A1 *   7/2012   .......... B25J 15/0061

*Primary Examiner* — Gregory Adams
(74) *Attorney, Agent, or Firm* — Kilpatrick Townsend & Stockton, LLP

(57) ABSTRACT

Described herein is a novel process for separating individual lubricated aluminum sheets from a stack of lubricated aluminum sheets as they enter a stamping press for fabrication. The process involves placing a lift underneath a stack of aluminum sheets and lifting the center upwards. This in turn causes the edges of the stack to bend downwards, creating a concave bending curvature facing the lift. The induced curvature is sufficient to provide the inter-sheet shear necessary to break the adhesion caused by the lubricant.

14 Claims, 2 Drawing Sheets

(56) References Cited

U.S. PATENT DOCUMENTS

| | | | | |
|---|---|---|---|---|
| 3,369,930 A * | 2/1968 | Wojtowicz | C10M 5/00 | 228/101 |
| 3,684,276 A * | 8/1972 | Bridgeman | G03B 42/045 | 271/106 |
| 3,720,407 A * | 3/1973 | Woodward | B65H 3/60 | 271/161 |
| 3,937,457 A * | 2/1976 | Schwebel | B65H 3/0833 | 271/92 |
| 4,129,328 A * | 12/1978 | Littell | B65G 47/918 | 294/65 |
| 4,663,528 A * | 5/1987 | Fujiwara | G03B 42/021 | 250/581 |
| 4,703,925 A | 11/1987 | Jelinek et al. | | |
| 4,824,093 A * | 4/1989 | Belden | B65H 33/02 | 271/150 |
| 4,824,308 A * | 4/1989 | Carboniero | B65G 59/045 | 271/105 |
| 4,848,764 A * | 7/1989 | Tajima | B65H 3/0816 | 250/589 |
| 4,909,499 A * | 3/1990 | O'Brien | B65H 3/5269 | 271/10.06 |
| 4,941,793 A * | 7/1990 | Shiraishi | B21D 43/05 | 198/458 |
| 5,176,494 A | 1/1993 | Nigrelli et al. | | |
| 5,288,065 A * | 2/1994 | Wyssmuller | B65H 3/60 | 271/105 |
| 5,380,147 A | 1/1995 | Hess et al. | | |
| 5,398,921 A * | 3/1995 | Emigh | B65H 1/30 | 271/126 |
| 5,433,426 A | 7/1995 | Bond | | |
| 5,632,181 A * | 5/1997 | Vanderzee | B21D 43/052 | 72/405.1 |
| 5,690,327 A * | 11/1997 | Menard | B65H 3/0808 | 271/106 |
| 5,915,682 A * | 6/1999 | Ambuhl | B65H 1/04 | 271/161 |
| 6,186,492 B1 * | 2/2001 | Dechau | B65H 1/18 | 271/11 |
| 6,345,818 B1 * | 2/2002 | Stephan | B25J 15/0052 | 271/106 |
| 6,468,025 B1 | 10/2002 | Stumpf et al. | | |
| 6,682,065 B2 * | 1/2004 | Leonarde | B65B 41/06 | 271/104 |
| 6,729,837 B1 * | 5/2004 | Ono | B65H 3/0833 | 271/106 |
| 6,746,063 B1 * | 6/2004 | Sanchez | B21D 43/24 | 271/18.1 |
| 6,886,827 B2 * | 5/2005 | Dachtler | B65H 3/0816 | 271/106 |
| 7,198,420 B2 * | 4/2007 | Yamamoto | B41J 13/10 | 271/145 |
| 7,281,739 B2 * | 10/2007 | Kniss | B25J 13/086 | 294/65 |
| 7,316,391 B2 * | 1/2008 | Stemmle | B65H 3/60 | 271/148 |
| 7,464,925 B2 * | 12/2008 | Dobbertin | B65H 1/04 | 271/148 |
| 7,731,173 B2 * | 6/2010 | Maruyama | B65G 59/045 | 271/105 |
| 7,891,655 B2 * | 2/2011 | Williams | B65H 3/0816 | 270/58.33 |
| 7,946,574 B2 * | 5/2011 | Bauvin | B65H 1/14 | 271/126 |
| 8,025,323 B2 * | 9/2011 | Ransom | B25J 15/0052 | 294/65 |
| 8,056,895 B2 * | 11/2011 | Yuen | B65H 3/40 | 271/105 |
| 8,944,481 B2 * | 2/2015 | Collado Jimenez | B25J 15/0061 | 294/185 |
| 2010/0295240 A1 * | 11/2010 | Brewer, III | B65H 31/22 | 271/220 |
| 2011/0181676 A1 * | 7/2011 | Chiwata | B65H 31/00 | 347/104 |
| 2011/0219641 A1 * | 9/2011 | Fujikura | B65H 31/02 | 34/619 |
| 2012/0224902 A1 * | 9/2012 | Chiwata | B65H 31/02 | 400/578 |

* cited by examiner

DE-STACKING PROCESS FOR THE SEPARATION OF LUBRICATED ALUMINUM SHEETS

CROSS-REFERENCE TO RELATED APPLICATION

This application claims the benefit of U.S. provisional application No. 61/970,641, filed Mar. 26, 2014, which is incorporated herein by reference in its entirety.

FIELD

Described herein is a process for separating individual lubricated aluminum sheets from a stack of lubricated aluminum sheets as they enter a stamping press for fabrication. In particular, this process has application in the automotive industry.

BACKGROUND

Body parts for many vehicles are fabricated from several body sheets. Thus far in the automotive industry, these sheets have been mostly made of steel. However, more recently there has been a trend in the automotive industry to replace the heavier steel sheets with lighter aluminum sheets.

In the body fabrication process, aluminum sheets are normally delivered to the stamping line in stacks. In order for the aluminum sheets to proceed into the stamping press, they need to be separated from the stack. However, in the fabrication process, a lubricant is used on the aluminum sheets to prevent damage, oxidation, and etc.

The lubricant, when combined with the lightweight and relatively thin gauge aluminum, promotes a relatively strong viscous hydrodynamic sticking of the sheets. Therefore, it is necessary "to break" this viscous layer to more easily separate the sheets for fabrication. As aluminum sheets need to be fabricated at high speeds, this presents a major problem.

Others in the field have tried to solve the problem of separating lubricated aluminum sheets from one another. For example, U.S. Pat. Nos. 6,468,025 and 4,703,925 disclose apparatuses whereby suction cups attach to a top sheet and pull one or both edges upward. As the edges are pulled upward, a stream of compressed air breaks the adhesion caused by the lubricant. U.S. Pat. No. 5,433,426 discloses another apparatus that uses suction cups to pull one or both edges of a metal sheet upward. As the edges are pulled, they are separated by adjacent horizontal ridges.

In addition to suction cups, mechanical screws, dimples, and brushes have been attempted, but these normally damage the sheet edges.

All of these methods, however, either utilize heavy and complex machinery that are costly to build and maintain or involve undesirable physical alterations to the aluminum sheets.

Thus, it is desirable to develop a unique and cost effective process for separating lubricated aluminum sheets from a stack of aluminum sheets that does not require the use of such machinery or damage the aluminum sheets. In addition, as separating aluminum sheets is a continuing source of downtime, it is desirable to develop a faster separation process.

SUMMARY

Described herein is a novel process for separating individual lubricated aluminum sheets from a stack of lubricated aluminum sheets as they enter a stamping press for fabrication. The process involves placing a lift underneath a stack of aluminum sheets imparting clearance of the center of the stack upwards. This in turn causes the edges of the stack to bend downwards, creating a concave bending curvature facing the lift. The induced curvature is sufficient to provide the inter-sheet shear necessary to break the adhesion caused by the lubricant. As a non-limiting example, the process described herein has particular application in the automotive industry.

DETAILED DESCRIPTION

Described herein is a novel process for separating individual lubricated aluminum sheets from a stack of lubricated aluminum sheets as they enter a stamping press for fabrication. The process involves inducing elastic curvature to the stack of aluminum sheets by the clearance imparted by the use of a lift. The induced curvature is sufficient to provide the inter-sheet shear necessary to break the sticking behavior caused by lubricants.

Applicant has found that the addition of a shear component during de-stacking aids in breaking the lubricant adhesion.

In a first embodiment, to induce the curvature it is necessary to raise the center (various patterns, including linear) of the stack, via a lift at the bottom of the stack. At a sufficiently high curvature, the edges of the aluminum sheets bend downward and cause the top sheet to naturally separate from the underlying stack. Any lift known to the person of ordinary skill in the art may suffice. Non-limiting examples are hydraulic lifts, jacks, wooden blocks, metal blocks, and plastic blocks, or any combination thereof. The lift may be in a variety of shapes to ensure that the bottom of the stack is not damaged or creased when in contact with the lift. As a non-limiting example, a hydraulic lift may have a curved end that contacts the stack.

Figure 1:
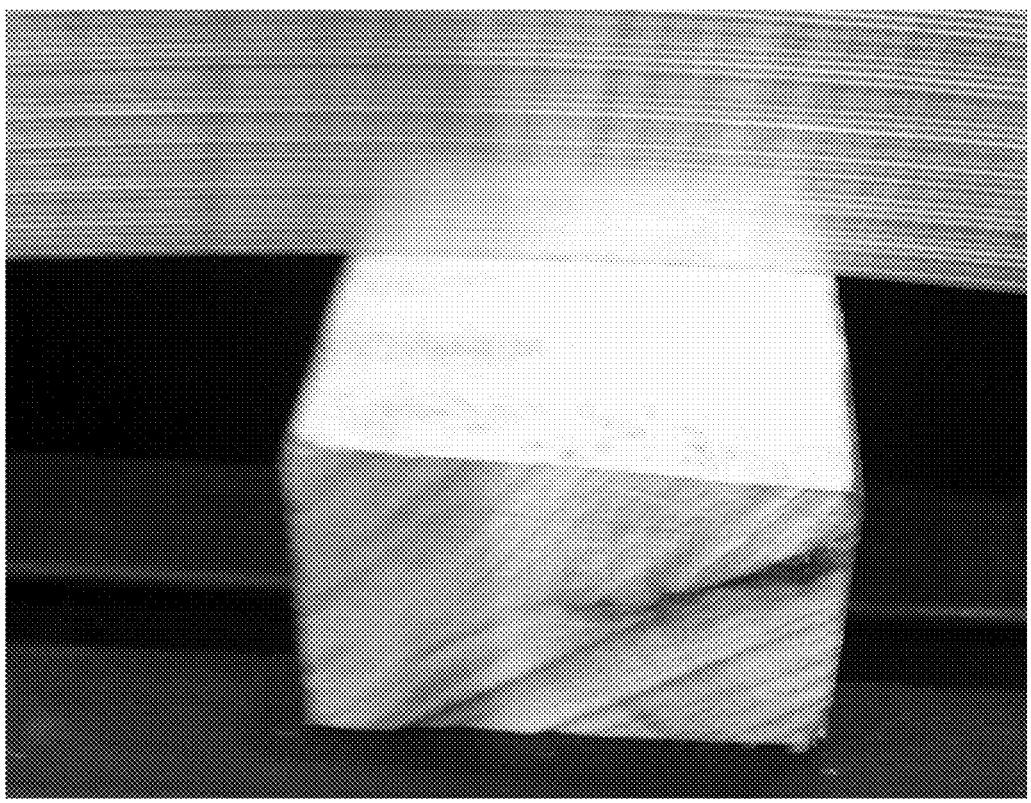
FIG. 1 is a picture showing the concave bending caused by a lift placed underneath a stack of aluminum sheets.

The lift may also be placed at varying positions under the stack in order to cause a particularly desired curvature of the stack, as depicted in FIG. 1. The position of the lift and the shape of the lift may be variable and may depend on the shape and size of the aluminum sheets.

Figure 2:
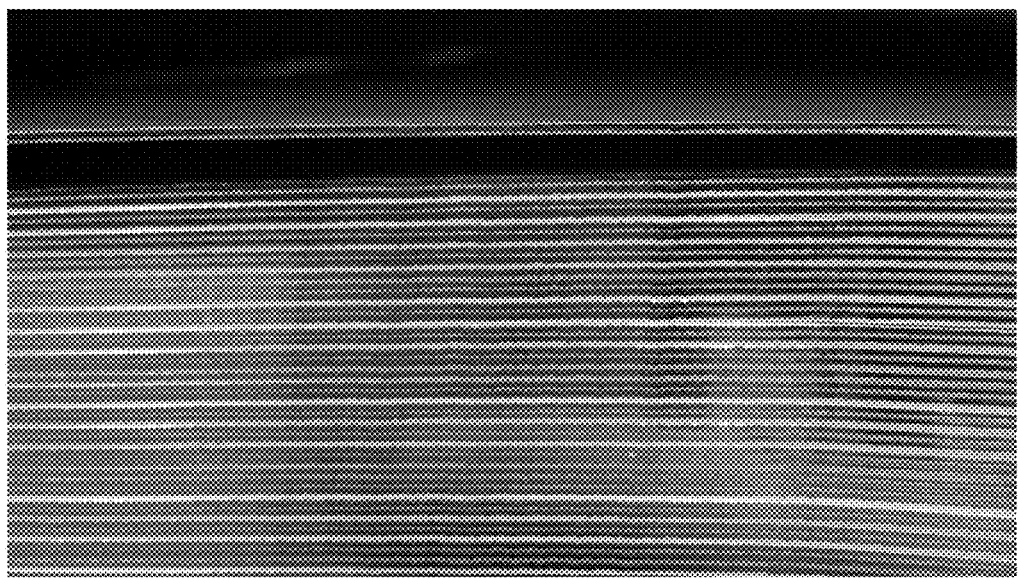
FIG. 2 is a picture showing the top aluminum sheet separated from the stack as a result of the concave bending.

In another embodiment, a lift is placed at the bottom of the stack and the stack is raised. At a sufficiently high curvature, the top sheet separates from the underlying stack, as depicted in FIG. 2. Compressed air, or air knives, is appropriately blown into the sheet edges to provide an additional degree of separation. In addition to compressed air, other gases and fluids such as water, alone or in combination, may be used to provide more separation.

While compressed air is not mandatory, since the bending stiffness of the sheet will promote this natural separation, its addition is certainly helpful to promote full separation. It was found that air knives applied to the axis of the curved edge is optimum.

In another embodiment, a lift is placed at the bottom of the stack and the stack is raised. With the induced curvature, the stack may be exposed to shaking or vibrating to help the top sheet separate from the underlying stack. As used herein, the terms shaking and vibrating include motion in either the vertical, horizontal, or diagonal directions, or any combination thereof. The speed of the shaking and vibrating may be adjusted by those of ordinary skill in the art to produce a desired result.

The amount of clearance imparted by the lift may be up to about 12 inches. For example, the amount of clearance may be up to about 1 inch, about 2 inches, about 3 inches, about 4 inches, about 5 inches, about 6 inches, about 7 inches, about 8 inches, about 9 inches, about 10 inches, about 11 inches, or about 12 inches.

Aluminum Sheets

The process described herein is not limited to any particular aluminum alloy sheet. The novel separation process may be used on any aluminum sheet that needs to be separated from a stack. As a non-limiting example, the process described herein can utilize AA5XXX series aluminum alloy sheets.

The thickness of the aluminum sheet can be from about 100 microns to about 4000 microns. For example, the core layer can be from about 150 microns to about 3500 microns, from about 200 microns to about 3000 microns, from about 250 microns to about 2500 microns, from about 300 microns to about 2000 microns, from about 350 microns to about 1500 microns, from about 400 microns to about 1000 microns, from about 450 microns to about 900 microns, from about 500 microns to about 800 microns, or from about 550 microns to about 700 microns.

The stack of aluminum sheets may comprise up to about 500 sheets. For example, the stack may comprise up to about 25, about 50, about 75, about 100, about 125, about 150, about 175, about 200, about 225, about 250, about 275, about 300, about 325, about 350, about 375, about 400, about 425, about 450, about 475, or about 500 sheets.

The area of each aluminum sheet may be up to about 100 inches×about 88 inches. For example, the area may be up to about 50 inches×about 38 inches, about 55 inches×about 43 inches, about 60 inches×about 48 inches, about 65 inches× about 53 inches, about 70 inches×about 58 inches, about 75 inches×about 63 inches, about 80 inches×about 68 inches, about 85 inches×about 73 inches, about 90 inches×about 78 inches, about 95 inches×about 83 inches, or about 100 inches×about 88 inches.

The aluminum sheets may be in any shape desired by a person of ordinary skill in the art to produce a particular result. The shaped aluminum sheets may be, for example, rectangular sheets, Chevron sheets, semi-developed sheets, and fully developed sheets, or any combination thereof.

Lubricant

Any lubricant may be used in the process described herein. Non-limiting examples are petroleum-based, oil-in-water emulsions, oil-based, water-based, and dry-film lubricants, or any combination thereof. Optionally, the lubricants are petroleum-based lubricants.

The amount of lubricant used in the process described herein may be up to about 300 mg/ft$^2$. For example, the amount may be up to about 25 mg/ft$^2$, about 50 mg/ft$^2$, about 75 mg/ft$^2$, about 100 mg/ft$^2$, about 125 mg/ft$^2$, about 150 mg/ft$^2$, about 175 mg/ft$^2$, about 200 mg/ft$^2$, about 225 mg/ft$^2$, about 250 mg/ft$^2$, about 275 mg/ft$^2$, or about 300 mg/ft$^2$.

Uses and Applications

In addition to use in the automotive industry to separate aluminum sheets prior to fabrication, the processes described herein may also be used in any industry that requires the separation of aluminum sheets. For example, the processes described herein may be used in the marine industry, aeronautic industry, and railway industry, among others.

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," and "the" includes singular and plural references unless the context clearly dictates otherwise.

As used herein, the term "clearance" is defined as the distance from the surface of what the stack is resting upon to the axis of the bend of the bottom of the stack caused by a lift.

EXAMPLES

Example 1

A first experiment was conducted on a stack of 300 lubricated aluminum sheets to test the amount of separation caused by inducing curvature.

Experimental:

A stack of 300 lubricated aluminum sheets (approximately 0.0315 inches×72 inches×60 inches) was lubed with 50 mg/ft$^2$ of MP-404 (a petroleum-based lubricant) and placed on a steel pin pallet.

A 2×4 wooden block was placed underneath the stack to produce shear. The experiment was repeated with a 4×4 wooden block and two 4×4 wooden blocks.

Results:

The 2×4 wooden block did not produce noticeable separation of the aluminum sheets.

The single 4×4 wooden block, which amounted to approximately 3 inches of clearance, produced some separation. However, the aluminum sheets were a bit difficult to separate.

Two 4×4 wooden blocks, which amounted to approximately 5 inches of clearance, produced well separated aluminum sheets that were de-stacked by hand. This stack was also treated with compressed air to test what effect the compressed air had on separation. The compressed air worked well and multiple sheets were observed separating from each other. The compressed air was also used on the 2×4 wooden block configuration, but the aluminum sheets did not separate well.

Example 2

This experiment was conducted to observe the effect of an additional 3 inches of clearance to the stack of Example 1.

Experimental:

An additional 3 inches of clearance was added to the 2×4 and 4×4 wooden blocks.

Results:

In all cases, the aluminum sheets separated better with more clearance. In addition, the compressed air produced much better separation. Compressed air blown along the axis of the bend worked the best and compressed air blown perpendicular to the bend axis was not effective.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

The invention claimed is:

1. A method of separating stacked lubricated aluminum sheets, comprising:
   a) placing a lift underneath a lowermost lubricated aluminum sheet of a stack of lubricated aluminum sheets at a position between opposing edges in the lowermost lubricated aluminum sheet, wherein each lubricated aluminum sheet of the stack of lubricated aluminum sheets comprises a longitudinal direction, a lateral direction substantially perpendicular to the longitudinal direction, and edges that extend in the longitudinal direction;
   b) imparting a curvature in the lateral direction in the aluminum sheets of the stack of lubricated aluminum sheets by the lift and separating the edges of the lowermost lubricated aluminum sheet that extend in the longitudinal direction from the edges of an adjacent lubricated aluminum sheet that extend in the longitudinal direction such that the edges of at least the lowermost lubricated aluminum sheet of the stack of lubricated aluminum sheets that extend in the longitudinal direction bend downwards, wherein the curvature is a concave curvature facing the lift that causes the edges of an uppermost lubricated aluminum sheet of the stack of lubricated aluminum sheets that extend in the longitudinal direction to separate from the stack of lubricated aluminum sheets, and creating a curvature in the topmost sheet that is less than the curvature of the next topmost sheet and separating vertically the respective edges of the topmost sheet and the next topmost sheet; and
   c) individually separating at least some of the lubricated aluminum sheets from the stack of lubricated aluminum sheets.

2. The method of claim 1, further comprising blowing compressed air along an axis of the curvature in step b) to induce further separation of the uppermost lubricated aluminum sheet from the stack of lubricated aluminum sheets.

3. The method of claim 1, further comprising shaking or vibrating the stack of lubricated aluminum sheets in step b) to induce further separation of the uppermost lubricated aluminum sheet from the stack of lubricated aluminum sheets.

4. The method of claim 1, wherein the lift comprises a hydraulic lift, a jack, a wooden block, a metal block, or a plastic block, or any combination thereof.

5. The method of claim 4, wherein the lift has a curved end that contacts the lowermost lubricated aluminum sheet of the stack of lubricated aluminum sheets.

6. The method of claim 1, wherein imparting the curvature in at least the lowermost lubricated aluminum sheet of the stack of lubricated aluminum sheets by the lift comprises:
   raising the stack of lubricated aluminum sheets with the lift from a base surface to a predetermined distance from the base surface, wherein the predetermined distance from the base surface is from about 3 inches to about 12 inches.

7. The method of claim 1, wherein each lubricated aluminum sheet of the stack of lubricated aluminum sheets has a thickness of from about 100 microns to about 4000 microns.

8. The method of claim 1, wherein each lubricated aluminum sheet of the stack of lubricated aluminum sheets has an area from about 50 inches by about 38 inches to about 100 inches by about 88 inches.

9. The method of claim 1, wherein the stack of lubricated aluminum sheets contains from about 25 to about 500 lubricated aluminum sheets.

10. The method of claim 1, wherein the stack of lubricated aluminum sheets comprise rectangular lubricated aluminum sheets, Chevron lubricated aluminum sheets, semi-developed lubricated aluminum sheets, or fully developed lubricated aluminum sheets, or any combination thereof.

11. The method of claim 1, wherein a lubricant that lubricates each lubricated sheet of the stack of lubricated aluminum sheets comprises a petroleum-based lubricant, an oil-in-water emulsion, an oil-based lubricant, a water-based lubricant, or a dry-film lubricant, or any combination thereof.

12. The method of claim 11, wherein the lubricant is the petroleum-based lubricant.

13. The method of claim 1, wherein an amount of lubricant used on each lubricated aluminum sheet of the stack of lubricated aluminum sheets is from about 25 mg/ft$^2$ to about 300 mg/ft$^2$.

14. The method of claim 1, wherein imparting the curvature in at least the lowermost lubricated aluminum sheet of the stack of lubricated aluminum sheets creates shear forces between the stack of lubricated aluminum sheets that break an adhesion bond between the stack of lubricated aluminum sheets.

* * * * *